(12) United States Patent
Tanno et al.

(10) Patent No.: US 10,160,271 B2
(45) Date of Patent: Dec. 25, 2018

(54) PNEUMATIC TIRE (71) Applicant: The Yokohama Rubber Co., LTD., Minato-ku, Tokyo (JP)

(72) Inventors: Atsushi Tanno, Hiratsuka (JP); Hayato Sakamoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 52 days.

(21) Appl. No.: 15/104,228

(22) PCT Filed: Dec. 9, 2014

(86) PCT No.: PCT/JP2014/082563
§ 371 (c)(1),
(2) Date: Jun. 13, 2016

(87) PCT Pub. No.: WO2015/087879
PCT Pub. Date: Jun. 18, 2015

(65) Prior Publication Data
US 2016/0318357 A1   Nov. 3, 2016

(30) Foreign Application Priority Data

Dec. 13, 2013   (JP) ................................. 2013-257640

(51) Int. Cl.
*B60C 23/04*       (2006.01)
*B29D 30/00*       (2006.01)

(52) U.S. Cl.
CPC ...... *B60C 23/0493* (2013.01); *B29D 30/0061* (2013.01); *B29D 2030/0072* (2013.01); *B60C 2200/06* (2013.01); *B60C 2200/065* (2013.01)

(58) Field of Classification Search
CPC .................. B60C 23/0493; B29D 30/0061
See application file for complete search history.

(56) References Cited

U.S. PATENT DOCUMENTS

| | | | |
|---|---|---|---|
| 4,099,303 A | 7/1978 | Parera | |
| 2003/0155054 A1 | 8/2003 | Bell | |
| 2006/0260726 A1 | 11/2006 | Bell | |
| 2010/0108222 A1 | 5/2010 | Bell | |
| 2010/0276048 A1* | 11/2010 | Adamson | B29D 30/0061 152/450 |

(Continued)

FOREIGN PATENT DOCUMENTS

| | | |
|---|---|---|
| DE | 10 2012 208 154 | 11/2012 |
| JP | S53-0125146 | 11/1978 |

(Continued)

OTHER PUBLICATIONS

International Search Report for International Application No. PCT/JP2014/082563 dated Feb. 24, 2015, 4 pages, Japan.

*Primary Examiner* — Jacob T Minskey
*Assistant Examiner* — Melody Tsui
(74) *Attorney, Agent, or Firm* — Thorpe North & Western (57) ABSTRACT

The pneumatic tire according to the present technology includes: one or more mechanical fastener members (A) disposed on the tire inner surface, which is one member of the pair of mechanical fasteners that can be separated into two members (A), (B) and that can be engaged with each other and which is secured to the tire cavity side, and the mechanical fastener members (A), (B) include a lock mechanism for locking the engagement.

8 Claims, 9 Drawing Sheets

(56) References Cited

U.S. PATENT DOCUMENTS

| | | | |
|---|---|---|---|
| 2011/0041295 A1* | 2/2011 | Reiter | A44B 17/0011 24/303 |
| 2011/0113630 A1 | 5/2011 | Bell | |
| 2012/0024439 A1* | 2/2012 | Tanno | B60C 23/0493 152/154.1 |
| 2012/0298272 A1* | 11/2012 | Tanno | B29D 30/0061 152/450 |
| 2014/0352420 A1 | 12/2014 | Pirelli | |

FOREIGN PATENT DOCUMENTS

| | | |
|---|---|---|
| JP | 2005-517581 | 6/2005 |
| JP | 2006-044503 | 2/2006 |
| JP | 2007-301165 | 11/2007 |
| JP | 2007-326536 | 12/2007 |
| JP | 2012-025318 | 2/2012 |
| JP | 2012-025319 | 2/2012 |
| JP | 2012-240465 | 12/2012 |
| WO | WO 2001/38111 | 5/2001 |
| WO | WO 2003/070496 | 8/2003 |
| WO | WO 2013/098712 | 7/2013 |

* cited by examiner

PNEUMATIC TIRE

TECHNICAL FIELD

The present technology relates to a pneumatic tire.

More specifically, the present technology relates to a pneumatic tire configured such that one of a pair of mechanical fastener members for attaching an object having a specific function is disposed on an inside surface of the pneumatic tire, the other being disposed on the side of the object having the specific function. The pair of mechanical faster members engage with each other so as to install the object having the specific function on the inside surface of the pneumatic tire. In particular, the engagement of the pair of mechanical fastener members is not readily removed, so that the object having the specific function can be stably and strongly held on the tire inner surface.

BACKGROUND ART

In recent years, various research into disposing objects having various functions on the inner circumferential surface of a pneumatic tire has been conducted.

For example, an attachment method has been proposed in which tire tags (radio frequency identification tags), chips, or the like are attached to an inner liner or the like of a green tire using a surface fastener such as a hook and loop fastener, a hook and hook fastener, or the like (Japanese Unexamined Patent Application Publication No. 2005-517581A).

Additionally, a pneumatic tire has been proposed in which a surface fastener is vulcanization bonded to a region of the tire inner surface corresponding to the tread portion, and a noise absorbing member is attached to the tire inner surface via the surface fastener (Japanese Unexamined Patent Application Publication No. 2006-44503A).

The surface fasteners proposed in Japanese Unexamined Patent Application Publication Nos. 2005-517581A and 2006-44503A have preferable configurations in that a relatively strong engagement force is realized when attaching, and surface engagement can be achieved without causing problems of slight misalignments when attaching.

However, with surface fasteners, the state in which the individual engaging elements of the surface fastener are engaged with one another is not ideal due to the inner circumferential surface of the pneumatic tire being an annular, curved surface. With surface fasteners, portions of the edges and center portions become raised, and the amount of engagement force obtained varies (positional variation within the tire and variation from tire to tire). As a result, in some cases, the expected engagement force has not been obtained.

Additionally, after starting to use the tires for driving, partial physical deterioration occurs as a result of repetitive deformation and compaction of the entire tire over an extended period of time caused by rotation at high speeds in a state of relatively elevated temperatures, accompanied by deterioration and reduction over time of the engagement force over the entire surface fastener. This has led to difficulty in maintaining the desired engagement force over an extended period of time.

In addition, it is said that surface fasteners are desirable because they are capable of realizing surface engagement without problems such as slight positional misalignments. However, when the attached functional object is, for example, a measuring device, more reliable and accurate attachment of the object to a position has been demanded. Because of this lack of reliable and precise attachment, there are functional objects not suited to being attached with a surface fastener.

Also, the present inventors have previously proposed a pneumatic tire whereby the desired engagement force can be maintained over an extended period of time, with minimal physical deterioration or decline over time of the engagement force due to extreme usage conditions, including repetitive deformation and compaction over an extended period of time caused by tire rotation at high speeds in a state of relatively elevated temperatures. The obtained engagement force is large and is essentially free of variation in strength (positional variation within the tire and variation from tire to tire). Specifically, a pneumatic tire is proposed in which various types of objects with desired functions are attached by bonding mechanical fasteners, known as hooks or snaps, to a tire inner surface (see Japanese Unexamined Patent Application Publication Nos. 2012-25318A, 2012-25319A, 2012-240465A and the like).

Specifically, as a typical example, a pneumatic tire has been proposed having on the tire inner surface one of a pair of mechanical fasteners such as hook or snap or the like and that can be separated into two, as described in the Claims of Japanese Unexamined Patent Application Publication No. 2012-25318A (Claim 1). More specifically a pneumatic tire has been proposed in which the one fastener is configured including at least two components, and the two components are fixed sandwiching a tire member or a tire reinforcing member (Japanese Unexamined Patent Application Publication No. 2012-25318A, Claim 2).

According to the methods of attaching a desired object by bonding a mechanical fastener (hook or snap) to the tire inner surface described in Patent Documents 3 to 5, an object can be engaged and attached to the tire inner surface via the mechanical fastener. Normally the engagement force obtained is large, and there is no variation (positional variation within the tire and variation from tire to tire) in the magnitude of the engagement force. In addition, a superior pneumatic tire is achieved that enables installation in the prescribed position with good accuracy, the desired engagement force can be maintained over an extended period of time, with minimal deterioration or decline over time of the engagement force due to repetitive extreme usage conditions over an extended period of time.

In particular, by using as the first mechanical fastener attached to the tire inner surface a fastener that includes at least two components, the two components being fixed together by sandwiching a tire member or a tire reinforcing member, a superior mechanical fastener with increased fixing strength and good durability is achieved.

However, even with this format, when the object installed is a large object or a heavy object, depending on the road surface on which the tire is driven, the engagement between the mechanical fasteners can be released, and the object with a specific function falls off. In particular, when a comparatively large and heavy object with a specific function is installed by engaging the pair of mechanical fastener members together, the engagement between them can be easily released by high speed rotational movement of the tire, and after being released, the mechanical engagement force can be reduced by deformation or the like, so it may be considered that a sufficiently large engagement force cannot be obtained if they are engaged again.

SUMMARY

The present technology provides a pneumatic tire configured such that one of a pair of mechanical fastener members for attaching an object having a specific function is disposed on the inner surface of the pneumatic tire, the other being disposed on the side of the object having the specific function, the pair of mechanical faster members being engaged with each other so as to install the object having the specific function on the inner surface of the pneumatic tire, and in particular, the engagement of the pair of mechanical fastener members is not readily removed, so that the object having the specific function can be stably and strongly held on the tire inner surface.

A pneumatic tire of the present technology has the configuration described in (1) below.

(1) A pneumatic tire, comprising: one or more mechanical fastener members A disposed on the tire inner surface, which is one member of a pair of mechanical fasteners that can be separated into two members A, B and the members A, B can be engaged with each other, and which is secured to the tire cavity side. The mechanical fastener members A, B include a lock mechanism for locking the engagement.

The pneumatic tire according to the present technology is preferably configured as described in any of (2) to (9) below.

(2) The pneumatic tire according to (1) above, wherein of the pair of mechanical fastener members, the mechanical fastener member A that is fixed to the tire cavity side includes a base part having a small diameter projecting column and a flat plate-like base portion, and a cover part having an insert hole whose internal diameter is larger than the diameter of the projecting column, the base part is embedded in the tire, the cover part is exposed on the tire inner surface, the base part and the cover part sandwich a tire member and are fixed to each other to configure the mechanical fastener member A.

(3) The pneumatic tire according to (1) or (2) above, wherein, upon the mechanical fastener member B that forms the pair with the mechanical fastener member A fixed to the tire cavity side engaging with the mechanical fastener member A fixed to the tire cavity side, the mechanical fastener member A contacts the mechanical fastener member B and presses the mechanical fastener member B, and a claw protrudes from the mechanical fastener member B to fit into a groove in the side surface of the mechanical fastener member A, so that the mechanical fastener members A, B engages with each other and configure the lock mechanism.

(4) The pneumatic tire according to (2) above, wherein the small diameter projecting column that forms the base part from which the mechanical fastener member A is configured has a cylindrical column shape, a central hole of the cylindrical column shape does not pass through the cylindrical column shape, and the flat plate-like base portion has a circular flat plate shape.

(5) The pneumatic tire according to (2) above, wherein the base part and the cover part sandwich a reinforcing member, which is the tire member, and are fixed together, to configure the mechanical fastener member A.

(6) The pneumatic tire according to (5) above, wherein the reinforcing member includes a rubber coated reinforcing fiber layer.

(7) The pneumatic tire according to any of (1) to (6) above, wherein the fixing strength of the mechanical fastener member A to the tire inner surface is greater than the engagement strength of the mechanical fastener members A, B when engaged and locked.

(8) The pneumatic tire according to any of (1) to (7) above, wherein the fixing strength of the mechanical fastener member A to the tire inner surface is from 0.5 to 100 $N/mm^2$, and the engagement strength of the mechanical fastener members A, B when engaged and locked is from 0.2 to 50 $N/mm^2$.

(9) The pneumatic tire according to (8) above, wherein the fixing strength of the mechanical fastener member A to the tire inner surface is from 1.0 to 80 $N/mm^2$, and the engagement strength of the mechanical fastener members A, B when engaged and locked is from 0.5 to 30 $N/mm^2$.

The pneumatic tire of the present technology as described in (1) is a pneumatic tire configured such that one of a pair of mechanical fastener members for attaching an object having a specific function is disposed on an inside surface of the pneumatic tire, the other being disposed on the side of the object having the specific function. The two mechanical fastener members are engaged with each other so as to install the object having the specific function on the inside surface of the pneumatic tire. In particular the engagement of the pair of mechanical fastener members is not readily released, so that the object having the specific function can be stably and strongly held on the tire inner surface.

Each of the pneumatic tires of the present technology described in (2) to (5) can exhibit the effect obtained from the pneumatic tire of the present technology as described in (1) more reliably. In particular, undoing of the mutual engagement of the pair of mechanical fastener members can be reliably minimized, and as a result the attached object does not fall off, so the object can exhibit its function stably for a long period of time.

Each of the pneumatic tires of the present technology described in (6) to (9) has the effect obtained from the pneumatic tire of the present technology as described in (1), as well as the effect of the present technology as described in each of (2) to (5). In addition, in particular, the mechanical fastener member A is more strongly fixed to the tire inner surface, and as a result the attached object falls off extremely rarely, so a pneumatic tire is provided for which the function of the object can be exhibited stably over a long period of time.

DETAILED DESCRIPTION

A detailed explanation of the pneumatic tire of the present technology will be given below.

Figure 1:
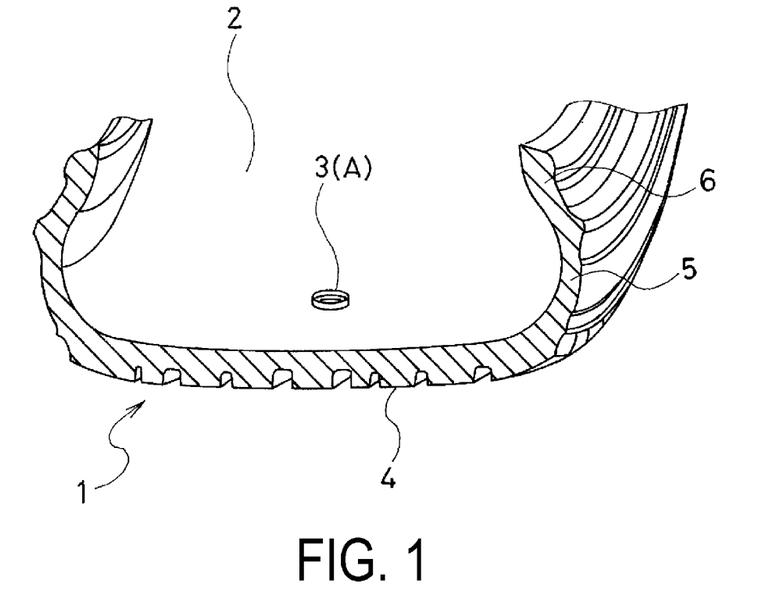
FIG. 1 is a cross-sectional perspective view partially cut of an embodiment of the pneumatic tire of the present technology, illustrating the main portion around the mechanical fastener member provided on the tire inner surface.

As illustrated in FIG. 1, a pneumatic tire 1 of the present technology comprises a member 3, which is the first member of a pair of mechanical fasteners separable into two members A and B and the members A and B can be engaged together, on a tire inner surface 2. There is one or more mechanical fastener members A fixed to the tire cavity side, and there is a locking mechanism for locking the mutual engagement of the mechanical fastener members A, B. In FIG. 1, 4 denotes a tread portion; 5 denotes a sidewall portion; and 6 denotes a bead portion.

In the present technology, "mechanical fastener" is configured from a pair of fastener members configured so that the mechanical fastener can be separated into the two fastener members and can be physically re-engaged, and this engaging and separating can be freely repeated. The mechanism of engagement itself is basically the same as that described in Japanese Unexamined Patent Application Publication Nos. 2012-25318A, 2012-25319A, and 2012-240465A as mentioned previously.

Exemplary types of such a mechanical fastener are those known as "hooks" or "snaps". Specific examples of products in the clothing industry that are generally included as mechanical fasteners are snap buttons, ring snaps, ring hooks, American snaps, American hooks, eyelet hooks, spring hooks, and jumper hooks. Such mechanical fasteners differ from surface fasteners in that while the area of the engaging part of a surface fastener is unlimited in the entire area, the area of the engaging part of a mechanical fastener is small (e.g. preferably from about 1 to 115 $mm^2$ and more preferably from about 4 to 90 $mm^2$). Such mechanical fasteners are, so to speak, point fasteners. In other words, even when engaged at a small area of from about 1 to 115 $mm^2$ for example, due to a mechanical male-female structure or the like, strong engaging is achieved. Thus, a conventional structure for the mechanical fastener may be used. The mechanical fastener can be formed from materials such as metals, synthetic resins, hard rubbers, and the like.

In the present technology, the mechanical fastener members A, B have a lock mechanism that locks the mutually engaged mechanical fastener members A, B. In other words, besides the engaging mechanism, there is a lock mechanism. By having this lock mechanism, undoing the mutual engagement of the mechanical fastener members A, B is minimized, so it is possible to prevent the object with a specific function that is installed within the tire cavity via the mechanical fastener members from falling off or dropping, and the object can be securely maintained within the tire cavity.

In the present technology, "the mechanical fastener members A, B have a lock mechanism that locks the mutually engaged mechanical fastener members A, B" includes mechanisms that satisfy all of the following requirements (a) to (c).

The mechanical fastener members have a structure such that (a) when engaging the mechanical fastener members A, B a force is applied in the direction that brings A and B close together to engage them, (b) when disengaging the mechanical fastener members A, B, a force is applied in the direction that separates A and B to disengage them, and (c) there is a mechanism that functions by applying a force in a direction that is different from the direction in (b) above at the stage before disengaging, and after this function is activated the operation in (b) above is enabled.

Of the requirements (a) to (c), it is important to have a structure that realizes requirement (c) in particular, and the engagement is locked means "the state of being engaged while requirement (c) is realized".

In order to form the state in which the engagement is locked, there are two methods, a method in which after engaging as described in (a) above further force is applied, and a method in which the state is formed simultaneously with engaging as described in (a) above, and the present technology may be used with either method.

Figure 2:
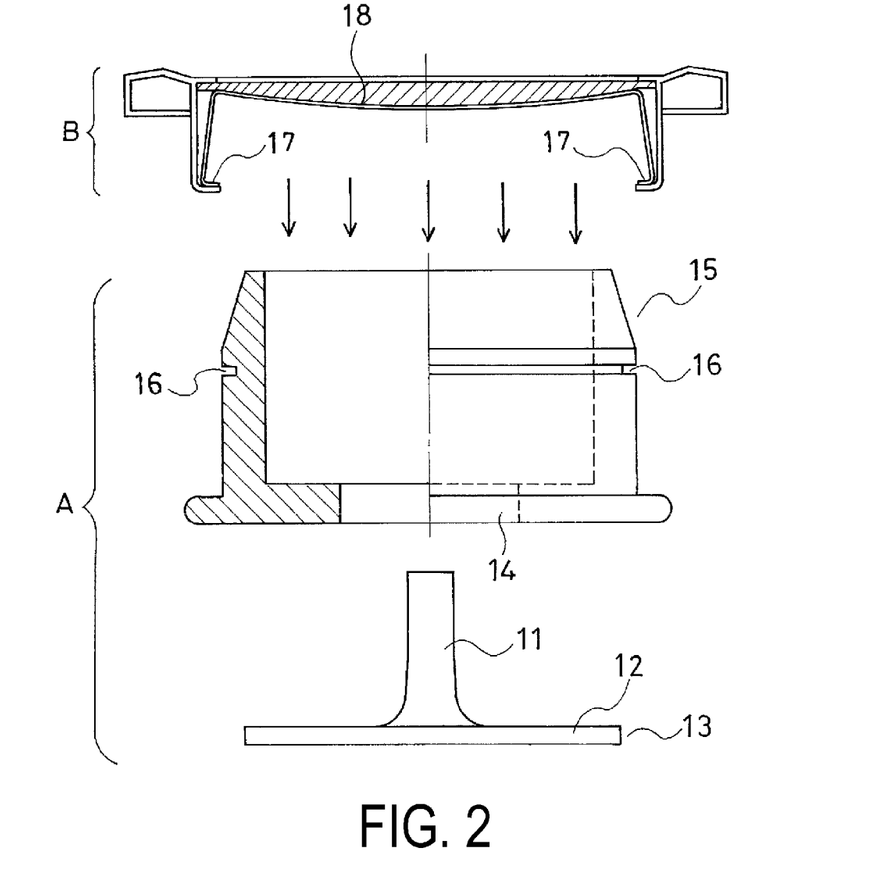
FIG. 2 is an exploded view illustrating an example of the structure of a pair of mechanical fasteners that can be used in the pneumatic tire of the present technology, that can be separated into two members A and B, and the members A and B can be engaged together.
Figure 3:
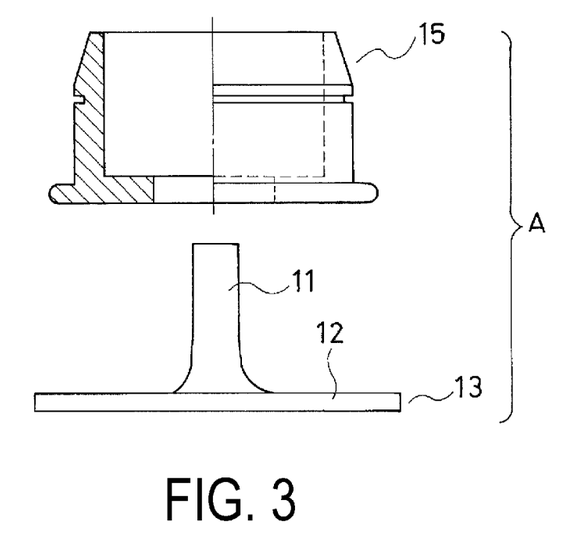
FIG. 3 is an exploded view illustrating an example of the structure of the mechanical fastener member A that can be used in the pneumatic tire of the present technology, and is the same as the mechanical fastener member A illustrated in FIG. 2.

In the present technology, of the pair of mechanical fastener members A, B, an example of a typical structure of the mechanical fastener member A that is fixed to the tire cavity side, as illustrated in FIG. 2, includes a base part 13 having a projecting column 11 with a small diameter and a flat plate-like base portion 12, and a cover part 15 having an insert hole 14 whose internal diameter is larger than the diameter of the projecting column 11. Preferably the mechanical fastener member A is configured by embedding the base part 13 in the tire interior (not illustrated) with the cover part 15 exposed on the tire interior surface, the base part 13 and the cover part 15 sandwiching a tire member (not illustrated). According to the discovery of the inventors, this combination structure can fix the mechanical fastener member A to the tire inner surface with the strongest fixing strength of the mechanical fastener member A.

Also, although not particularly limited to that illustrated only, one example of a structure having a lock mechanism that locks the mutually engaged mechanical fastener members A, B is preferably configured so that when the mechanical fastener member B, which forms a pair with the mechanical fastener member A that is fixed within the tire cavity, is engaged with the mechanical fastener member A that is fixed within the tire cavity, the mechanical fastener member A contacts the mechanical fastener member B and presses the mechanical fastener member B, and a claw 17 protrudes from the mechanical fastener member B to fit into a groove 16 in the side surface of the mechanical fastener member A, so that the mechanical fastener members A, B engages with each other and configure the lock mechanism, as schematically illustrated in FIG. 2. In this form, a portion 18 of the mechanical fastener member B that is pressed on contact with the mechanical fastener member A has a spring characteristic such that when pressed it becomes depressed to the opposite side (in the drawing, the upper side), and at the same time that it is depressed to the opposite side the claw 17 protrudes towards the central axis thereof. As the state of engagement of the two members A, B progresses, the protruding claw 17 fits into the groove of the member A, and the state of engagement of the two members becomes locked. This locking mechanism has a comparatively simple configuration, and its operation is reliable, so it is preferred. In the present technology, by employing the lock mechanism for engagement of the mechanical fastener members A, B, release of the engagement (fitting) of the mechanical fastener due to external forces (centrifugal force or excessive road surface input) is eliminated.

Note that the spring characteristic that becomes depressed in the pressing direction when pressed is a characteristic that has been used for a long time for metal lids of square cans and the like for containing paint or the like. To release the lock the top of the mechanical fastener member B is pressed downward and depressed, so the protruding claw 17 opens to its original state, separates from the groove 16, and the lock is released.

Figure 4:
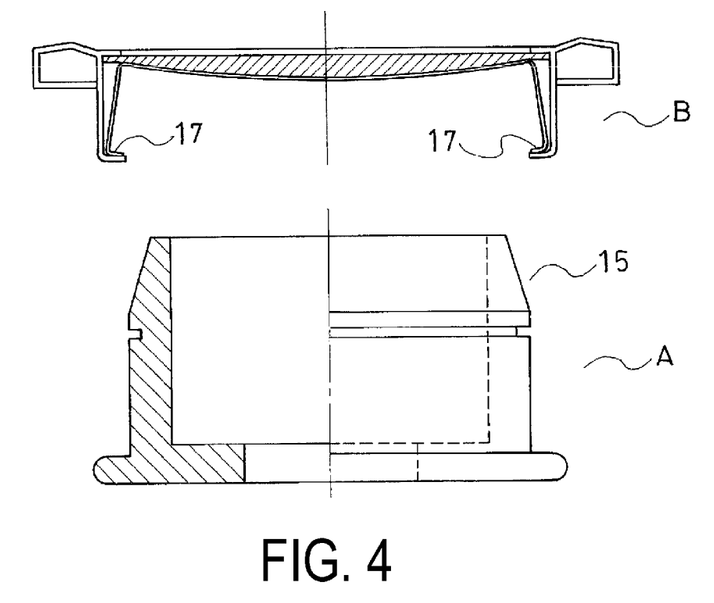
FIG. 4 is an exploded view illustrating an example of the structure of the pair of mechanical fastener members A, B that can be used in the pneumatic tire of the present technology, and is the same as the mechanical fastener members A, B illustrated in FIG. 2, but the base part of the mechanical fastener member A is not illustrated.
Figure 6:
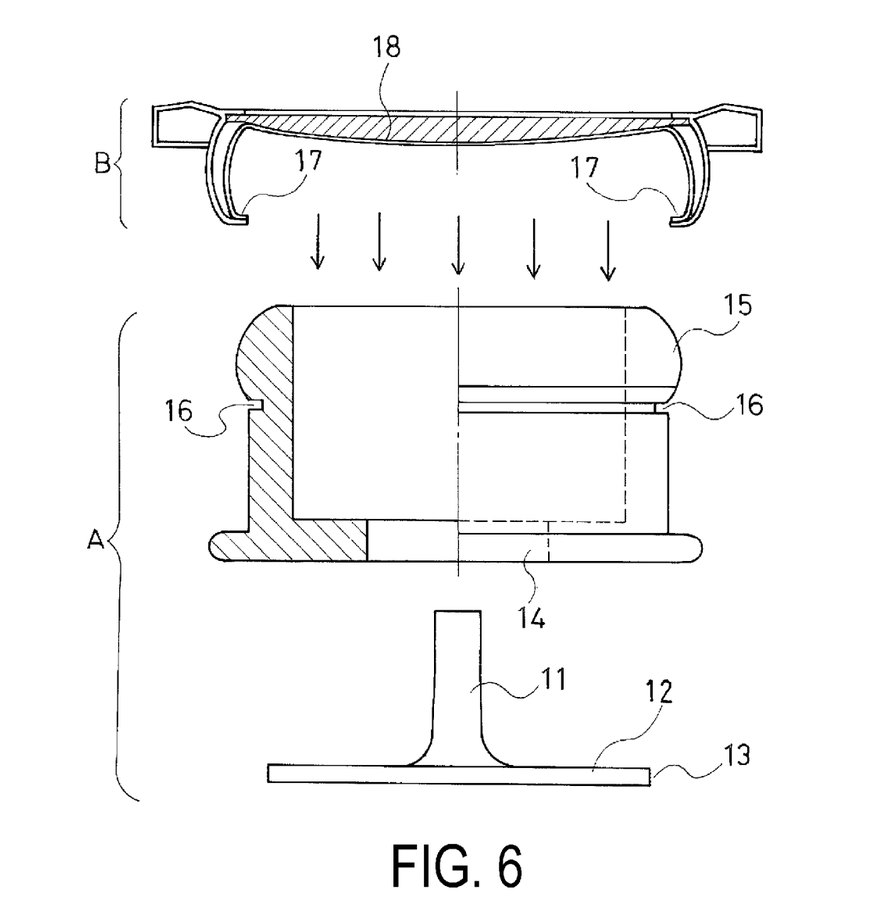
FIG. 6 is another example of the structure of a pair of mechanical fasteners that can be used in the pneumatic tire of the present technology, that can be separated into two members A and B, and the members A and B can be engaged together, and is an exploded view the same as for FIGS. 2 and 4.

FIG. 6 is another example of the structure of a pair of mechanical fasteners that can be used in the pneumatic tire of the present technology, and is an exploded view the same as for FIGS. 2 and 4. The point of difference from the examples illustrated in FIGS. 2 and 4 is that the cross-sectional edge lines in the axial direction of the cover part 15 of the fastener member A have a circular arc shape forming a convex portion bulging to the outer peripheral side. The fastener member B is also made in a shape so that it can fit onto the cover part 15. Because it has the bulging shape, once the claw 17 has protruded and fit into the groove 16, the locking effect is extremely large.

In the present technology, preferably the small diameter projecting column 11 that forms the base part 13 from which the mechanical fastener member A is configured has a cylindrical column shape, a central hole does not pass through the cylindrical column shape, and the flat plate-like base portion has a circular flat plate shape. If a central hole passes through the cylindrical column shape, unvulcanized rubber that passes through the hole during vulcanization molding of the tire could flow to the cover part 15 side (tire cavity side), and the tire would not be properly formed at this part, which is undesirable. Forming a non-penetrating central hole in the cylindrical column shape may be carried out by applying a sealing member such as a plate shape to the flat plate (base of the column), or placing a stopper on the column shape.

Also, the flat plate-like base portion is formed in a circular plate shape, so the fixing strength of the mechanical fastener member A is more uniform in all directions, which is desirable. The diameter of the flat plate-like base portion 12 is larger than the external form of the maximum diameter part of the cover part 15, and this is desirable in terms of increasing the fixing strength of the mechanical fastener member A.

Figure 5:
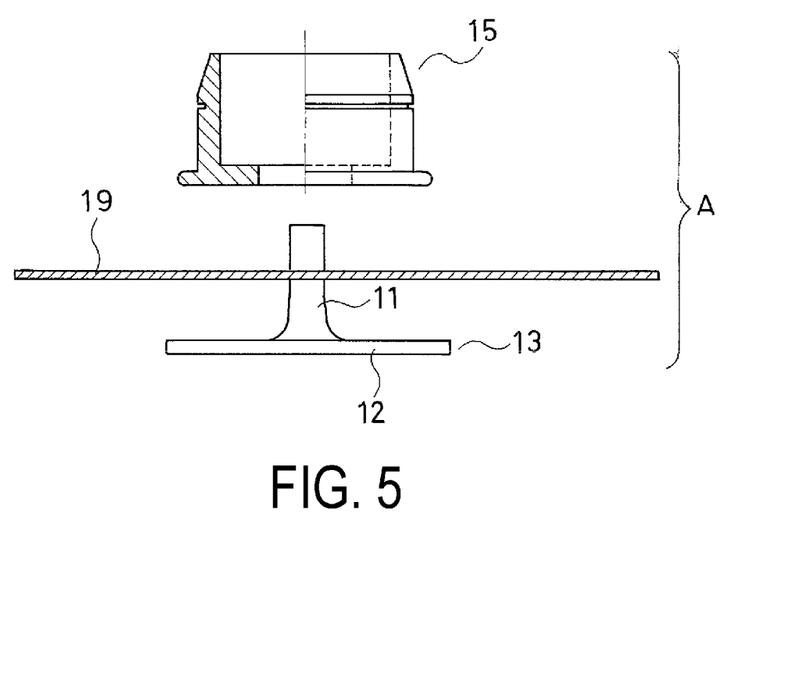
FIG. 5 is an exploded view illustrating another example of the structure of the mechanical fastener member A that can be used in the pneumatic tire of the present technology, the point of difference from the mechanical fastener member A illustrated in FIGS. 2 and 3 is that it is illustrated as fixed to the tire inner surface via a reinforcing member.

Also, as illustrated in FIG. 5, the mechanical fastener member A includes the base part 13 and the cover part 15. The base part 13 is embedded within the tire, and the cover part 15 is exposed on the tire inner surface. The base part 13 and the cover part 15 sandwich a reinforcing member 19, which is the tire member, and are fixed together to configure the mechanical fastener member A. The fixing strength of the mechanical fastener member A is preferably in the range of 0.5 to 100 N/mm$^2$.

Making the fixing strength of the mechanical fastener member A to the tire inner surface greater than the engagement strength when the mechanical fastener members A, B are engaged and locked is desirable for fixing the mechanical fastener member A to the tire inner surface or forming the engagement structure of the mechanical fastener members A, B. The reason is because if the state of engagement gradually fails due to, for example, the mass of the object installed by engaging with the tire inner surface after starting to tires for driving, it is desirable the engaged and locked state of the mechanical fastener members A, B fails before the fixing state of the mechanical fastener member A to the tire inner surface fails since the damage to the tire main body side will be smaller.

However, it is of course necessary that the engagement strength of the mechanical fastener members A, B when engaged and locked is a certain level or higher, and according to the knowledge of the present inventors preferably the engagement strength is from 0.2 to 50 N/mm$^2$.

Therefore, in the overall configuration preferably the fixing strength of the mechanical fastener member A to the tire inner surface is greater than the engagement strength of the mechanical fastener members A, B when engaged and locked, and the fixing strength of the mechanical fastener member A to the tire inner surface is from 0.5 to 100 N/mm$^2$, and the engagement strength of the mechanical fastener members A, B when engaged and locked is from 0.2 to 50 N/mm$^2$.

By satisfying these conditions overall, the functional characteristics of the object installed by engaging onto the tire inner surface can be exhibited over a long period of time until failure of the engagement and locked state of the mechanical fastener members A, B, while reliably maintaining the fixing state of the mechanical fastener member A to the tire inner surface. A fixing strength of the mechanical fastener member A to the tire inner surface in the range of 1.0 to 80 N/mm$^2$ is more preferable for the normal mass of the installed objects. Also, more preferably the engagement strength of the mechanical fastener members A, B when engaged and locked is from 0.5 to 30 N/mm$^2$.

In the present technology, the attachment position of the mechanical fastener member 3(A) may, for example, be in the vicinity of the tire equator of the tire inner surface as illustrated in FIG. 1, but is not particularly limited thereto. The mechanical fastener member 3 may also be disposed on the tire inner surface in the vicinity of the bead portion 6 or the sidewall portion 5, where centrifugal forces due to tire rotation and repeated deformation of the tire inner surface accompanying tire rolling motion have a smaller impact than the impact on the tread portion 4. A plurality of mechanical fastener members 3(A) may also be provided dispersed in multiple locations. This is because if one becomes unusable, another can be used.

The present inventors believe that a fixing strength in the above range (0.5 to 100 N/mm$^2$) is sufficient for a mechanical fastener member 3 to be applied to the majority of cases of attachment-fixing of an object to be attached inside a tire cavity. A mechanical fastener member 3 with a fixing strength of less than 0.5 N/mm$^2$ cannot be applied to the attachment of a heavy object. Also, a mechanical fastener member 3 with a fixing strength of greater than 100 N/mm$^2$ would require increasing stiffness. If the stiffness at the portion of the tire structure where it is fixed was increased, the stiffness in the circumferential direction of the tire becomes uneven and consequently uniformity would decrease. Alternatively, if the stiffness all around the tire was increased, manufacturing cost would increase unnecessarily. Both cases are not preferable.

Here, "tire member" refers to a component of the tire made of rubber, resin, or the like, and specifically refers to an inner liner, a carcass, or the like. Alternatively, a reinforcing layer, such as a rubber layer, a rubber coated reinforcing fiber layer, a resin layer, or a laminated layer of a plurality of these layers, that is used for this purpose sandwiched between the base part 13 and the cover part 15 of the fastener member A may be additionally disposed on the tire inner surface as the reinforcing member 19. Such a configuration is preferable because, generally, the air barrier properties of the tire are enhanced.

The object having a specific function installed on the inside surface of the pneumatic tire may be selected based on desired functionality and is not particularly limited. Preferable examples thereof include one or a combination of (a) an electronic circuit including a sensor, (b) a balance weight, (c) a run-flat core, (d) an object on which an oxygen scavenger, a drying agent, and/or an ultraviolet light detecting color fixing agent is applied or mounted, and (e) a noise absorbing member.

The pneumatic tire of the present technology is in practice preferably a tire for construction vehicles with a tire external diameter of 0.8 m or greater, or for industrial vehicles, or for heavy duty tires. This is because, although air pressure meters are often mounted on these tires to monitor and check air pressure inside the tire cavity and the like, the wheels used therefor normally have a shape that is difficult to attach air pressure meters to, so normally they are attached on the tire inner surface.

EXAMPLES

The pneumatic tire of the present technology is described below based on working examples.

Note that in the present technology, the fixing strength of the mechanical fastener member A and the engagement strength of the mechanical fastener members A, B when engaged and locked is measured by the following methods.

(A) Method of Measuring the Fixing Strength of the Mechanical Fastener Member A

Figure 7A:
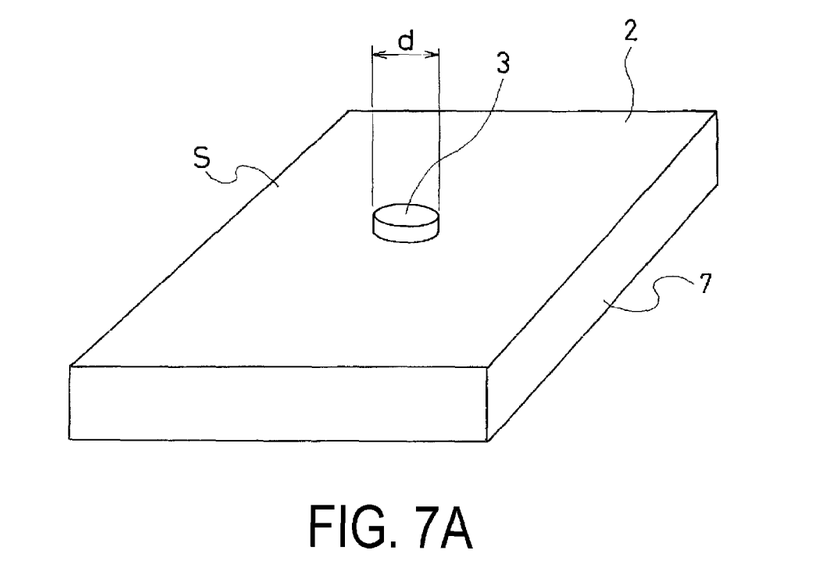
FIGS. 7A and 7B are perspective views for explaining the method of measuring the fixing strength of any of the mechanical fastener members employed in the present technology.
Figure 8A:
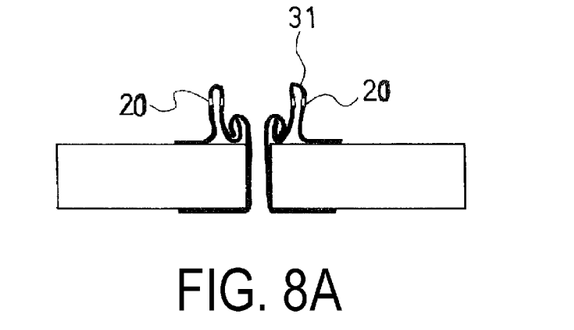
FIGS. 8A and 8B are schematic views for explaining the method of measuring the fixing strength of any of the mechanical fastener members employed in the present technology. A method in which a shaft shaped jig for a tensile test is engaged with the mechanical fastener member is illustrated.

A green tire in which the mechanical fastener member 3 is disposed is vulcanized to manufacture a tire according to the present technology. Then, a portion of the tire around the mechanical fastener member 3 is cut out, to provide a test sample S (see FIG. 7A). A pair of holes 20 (see FIG. 8A) is opened in the mechanical fastener member 3 in the test sample and a rod shaped piercing jig 22 is passed through the pair of holes 20. A shaft shaped jig for a tensile test 23 is attached to the test sample via the piercing jig 22 (see FIG. 8B). The shaft shaped jig for a tensile test 23 has the configuration illustrated in the schematic diagram of FIG. 9 and includes the pair of holes 21 located in the vicinity of the cylindrical end portion.

Figure 7B:
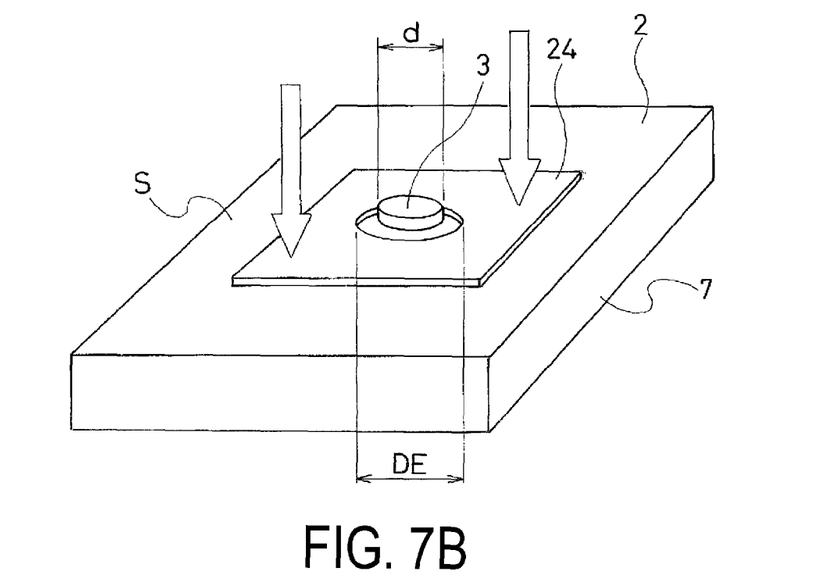
Figure 8B:
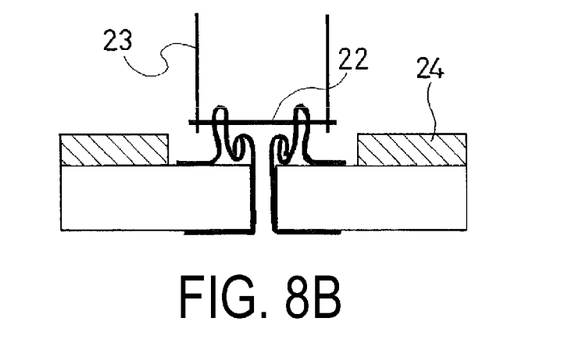
Figure 9:
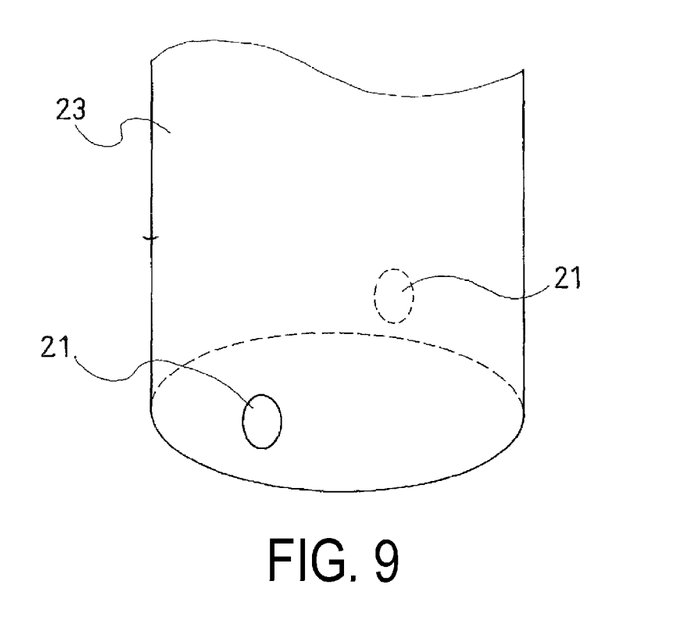
FIG. 9 is a schematic view for explaining the method of measuring the fixing strength of the mechanical fastener member employed in the present technology. An example of the structure of the shaft shaped jig for a tensile test engaged with the mechanical fastener member is schematically illustrated.

When pulling out the mechanical fastener member 3 via the shaft shaped jig for a tensile test 23 is performed, a fixing board 24 is disposed on the tire inner surface 2 around the mechanical fastener member 3, as illustrated in FIGS. 7B and 8B, and the breaking force is obtained when the mechanical fastener member 3 is pulled out in the vertical direction in respect to the fixing board 24. The pulling speed is 500±50 mm/min.

Note that the fixing board 24 thus used has a hole with a diameter DE of from 1.30 to 1.35 times the diameter d of the protruding portion of the mechanical fastener 3. When pulling out the mechanical fastener member 3 is performed as described above, the fixing board 24 is firmly fixed so as to not rise. In such a manner, the shaft shaped jig for a tensile test 22 is pulled vertically, and the maximum value of the tensile force at the time the mechanical fastener 3 separates from the tire structure is taken to be the breaking force.

The obtained value of the breaking force is divided by the maximum cross-sectional area of the mechanical fastener member 3 to give the value per unit cross-sectional area (N/mm$^2$). The same test is performed on three test samples, and the average value is taken as the fixing strength (N/mm$^2$).

Note that the method of measuring described above is merely a detailed example of a method of measuring. As long as the above-described tensile testing method is used as the basis, the method may be changed more suitable according to the shape of the mechanical fastener and the like.

(B) Method of Measuring the Engagement Strength of the Mechanical Fastener Members A, B when Engaged and Locked A tensile test in the axial direction of the mechanical fastener members A, B that are engaged and locked (tension speed 500±50 mm/minute. Basically the same tension speed as the test method for the fixing strength of the mechanical fastener member A described in (A) above) is carried out, the load obtained is divided by the area of the engaged and locked part (if the engaged and locked part is ring shaped, include also the area of the enclosed inner portion), to obtain the engagement strength (N/mm$^2$) of the mechanical fastener members A, B when engaged and locked. The same test is carried out on three test samples, and their average value is taken to be the engagement strength (N/mm$^2$).

Working Example 1 and Comparative Example 1

Pneumatic tires of the present technology were manufactured with the members A and B capable of being engaged and locked by the mechanisms illustrated in FIGS. 2 and 4 as the mechanical fastener members.

Fixing the mechanical fastener members was carried out by sandwiching a rubber coated reinforcing fiber layer (a fabric woven using nylon fiber thread in the warp and woof, filled with rubber) 19 between the member A and the member B, as illustrated in FIG. 5, and carrying out the vulcanization molding process.

Figure 10:
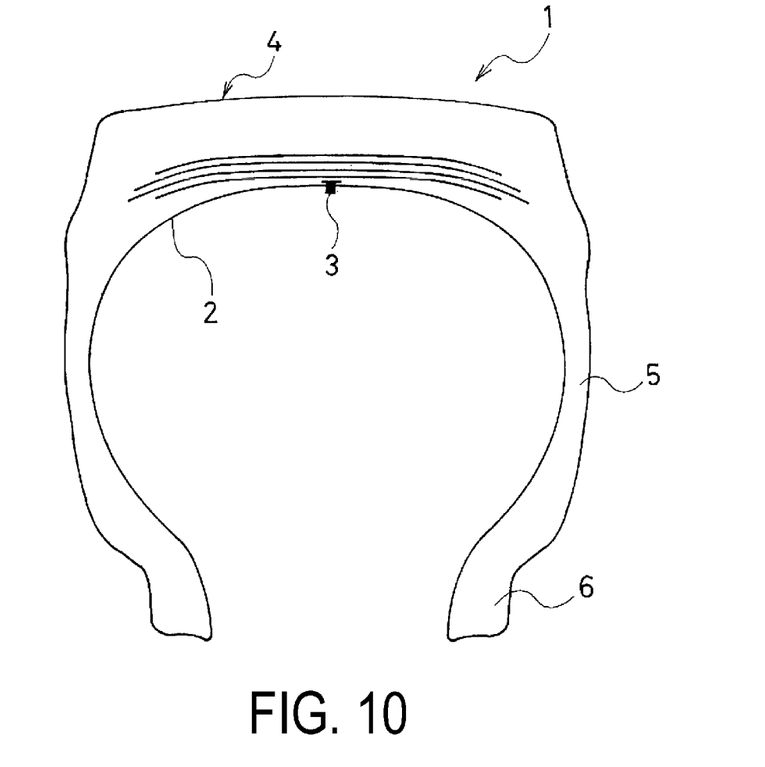
FIG. 10 is a tire meridian direction cross-sectional view schematically illustrating the fixing position of the mechanical fastener member employed in the working examples.

In other words, the pneumatic tire was a tire for an industrial vehicle (diameter: about 2,670 mm), with one mechanical fastener member 3 provided at the equator of the inner circumferential surface of the tread portion as illustrated in FIG. 10, vulcanization bonded by the tire vulcanization process (Working Example 1).

On the other hand, pneumatic tires having a mechanical fastener member that was the exact same as for Working Example 1 as described above except that a special lock mechanism was not provided for the engagement of the two members A and B were manufactured (Comparative Example 1).

For each of the test tires obtained the fixing strength of the mechanical fastener member and the engagement strength of the mechanical fastener members A, B were compared.

The results were as shown in Table 1, from which it can be seen that the engagement strength of the mechanical fastener members A, B of Working Example 1 of the present technology was clearly superior compared with that of Comparative Example 1.

In both test tires, an air pressure sensor (with a transmitter) was fixed using the respective mechanical fastener members.

When both test tires were subjected to a forced rotation test (30 km/h), in the case of Comparative Example 1, after 20 hours the fixing of the air pressure sensor (with transmitter) to the tire inner surface was undone due to the engagement of the two mechanical fastener members A and B being released. In contrast, in the case of Working Example 1 of the present technology there was no problem either with the fixing state of the mechanical fastener member or the state of engagement of the mechanical fastener members A, B even after 100 hours.

TABLE 1

| | Working Example 1 | Comparative Example 1 |
|---|---|---|
| Fixing strength of the mechanical fastener member A to the tire inner surface (N/mm$^2$) | 12 | 12 |
| Engagement strength of the mechanical fastener members A, B (N/mm$^2$) | 2.0 | 0.1 |
| Forced durability test | Excellent (no fault with the mechanical fixing members or their surroundings 100 hours after start of the forced test) | Normal (at 20 hours after start of the forced test, the engagement state became undone) |

The invention claimed is:

1. A pneumatic tire, comprising:
   one or more mechanical fastener members A disposed on a tire inner surface, each mechanical fastener member A being one member of a pair of mechanical fasteners that can be separated into two members A, B and the members A, B can be engaged with each other, and each mechanical fastener member A being secured to a tire cavity side;
   the mechanical fastener members A, B including a lock mechanism for locking the engagement, wherein
   of the pair of mechanical fastener members, the mechanical fastener member A that is fixed to the tire cavity side includes a base part and a cover part, wherein
   the base part is embedded in the tire, the cover part is exposed on the tire inner surface, and the base part and the cover part sandwich a tire member and are fixed to each other to configure the mechanical fastener member A.

2. The pneumatic tire according to claim 1, wherein
   the base part has a small diameter projecting column and a flat plate-like base portion, and the cover part has an insert hole whose internal diameter is larger than the diameter of the projecting column; and
   the small diameter projecting column that forms the base part from which the mechanical fastener member A is configured has a cylindrical column shape, a central hole of the cylindrical column shape does not pass through the cylindrical column shape, and the flat plate-like base portion has a circular flat plate shape.

3. The pneumatic tire according to claim 1, wherein
   upon the mechanical fastener member B that forms the pair with the mechanical fastener member A fixed to the tire cavity side engaging with the mechanical fastener member A fixed to the tire cavity side, the mechanical fastener member A contacts the mechanical fastener member B and presses the mechanical fastener member B, and a claw protrudes from the mechanical fastener member B to fit into a groove in a side surface of the mechanical fastener member A, so that the mechanical fastener members A, B engages with each other and configure the lock mechanism.

4. The pneumatic tire according to claim 2, wherein
   the base part and the cover part sandwich a reinforcing member, which is the tire member, and are fixed together, to configure the mechanical fastener member A.

5. The pneumatic tire according to claim 4, wherein the reinforcing member includes a rubber coated reinforcing fiber layer.

6. The pneumatic tire according to claim 1, wherein
   the fixing strength of the mechanical fastener member A to the tire inner surface is greater than the engagement strength of the mechanical fastener members A, B, upon the mechanical fastener members A, B being engaged and locked.

7. The pneumatic tire according to claim 1, wherein
   the fixing strength of the mechanical fastener member A to the tire inner surface is from 0.5 to 100 N/mm$^2$, and the engagement strength of the mechanical fastener members A, B, upon the mechanical fastener member A, B being engaged and locked, is from 0.2 to 50 N/mm$^2$.

8. The pneumatic tire according to claim 7, wherein
   the fixing strength of the mechanical fastener member A to the tire inner surface is from 1.0 to 80 N/mm$^2$, and the engagement strength of the mechanical fastener members A, B upon the mechanical fastener members A, B being engaged and locked is from 0.5 to 30 N/mm$^2$.

* * * * *